United States Patent [19]

Adams et al.

[11] 4,124,128
[45] Nov. 7, 1978

[54] SHINGLE STACKING

[75] Inventors: Albert A. Adams, Malvern; Karoly G. Balogh, Springfield; Tommy J. Prugh, Doylestown, all of Pa.

[73] Assignee: Certain-teed Corporation, Valley Forge, Pa.

[21] Appl. No.: 842,075

[22] Filed: Oct. 14, 1977

[51] Int. Cl.² .............................................. B65G 57/06
[52] U.S. Cl. .................................. 214/6 DK; 53/143; 198/374; 198/403; 198/407; 214/6.5; 271/65; 271/192
[58] Field of Search ............... 214/6 DK, 6.5; 53/143; 198/374, 403, 404, 406, 407, 408; 271/65, 186, 192

[56] References Cited

U.S. PATENT DOCUMENTS

| | | | |
|---|---|---|---|
| 3,070,211 | 12/1962 | Williamson | 214/6 DK |
| 3,128,889 | 4/1964 | Johnson et al. | 214/6 DK |
| 3,154,307 | 10/1964 | Williamson | 214/6 DK |
| 3,205,794 | 9/1965 | Califano et al. | 214/6 DK |
| 3,967,723 | 6/1976 | Beckham | 271/65 |

FOREIGN PATENT DOCUMENTS

| | | | |
|---|---|---|---|
| 964,583 | 5/1957 | Fed. Rep. of Germany | 214/6.5 |
| 561,530 | 4/1957 | Italy | 214/6.5 |
| 90,083 | 11/1957 | Norway | 214/6.5 |

*Primary Examiner*—Albert J. Makay
*Assistant Examiner*—Ross Weaver
*Attorney, Agent, or Firm*—Paul & Paul

[57] ABSTRACT

Shingles or the like are usually rectangular in shape and of non-uniform thickness being of a greater thickness at one long edge and of lessor thickness at the other. Such shingles are arranged by automatic equipment for stacking in squared bundles by delivering the shingles one at a time successively and individually onto a pair of laterally-spaced movable shelves formed by a pair of starwheels. By intermittent simultaneous angular movement of both starwheels, or by intermittent angular movement of only the front starwheel while maintaining the rear starwheel motionless, a group (such as five) of accumulated shingles is dropped without flipping onto a transversely moving conveyor belt. By intermittent angular movement of only the rear starwheel while maintaining the front starwheel motionless, a group of shingles is flipped, i.e. turned over on to its other side. If the spacing between the starwheels and the moving conveyor belt is sufficient, the group of shingles will flip through 180° without aid from the transversely moving conveyor belt. Where the spacing between the starwheels and conveyor belt is less, the group of shingles will not be completely flipped by the time it reaches the conveyor belt. In such case, flipping will be completed by the action of the conveyor belt moving in the same transverse directon as the transverse component of movement of the lower edge of the falling group of shingles. By stacking together in one bundle an equal, or approximately equal, number of flipped and unflipped groups of shingles, a bundle having substantially uniform height is obtained.

10 Claims, 10 Drawing Figures

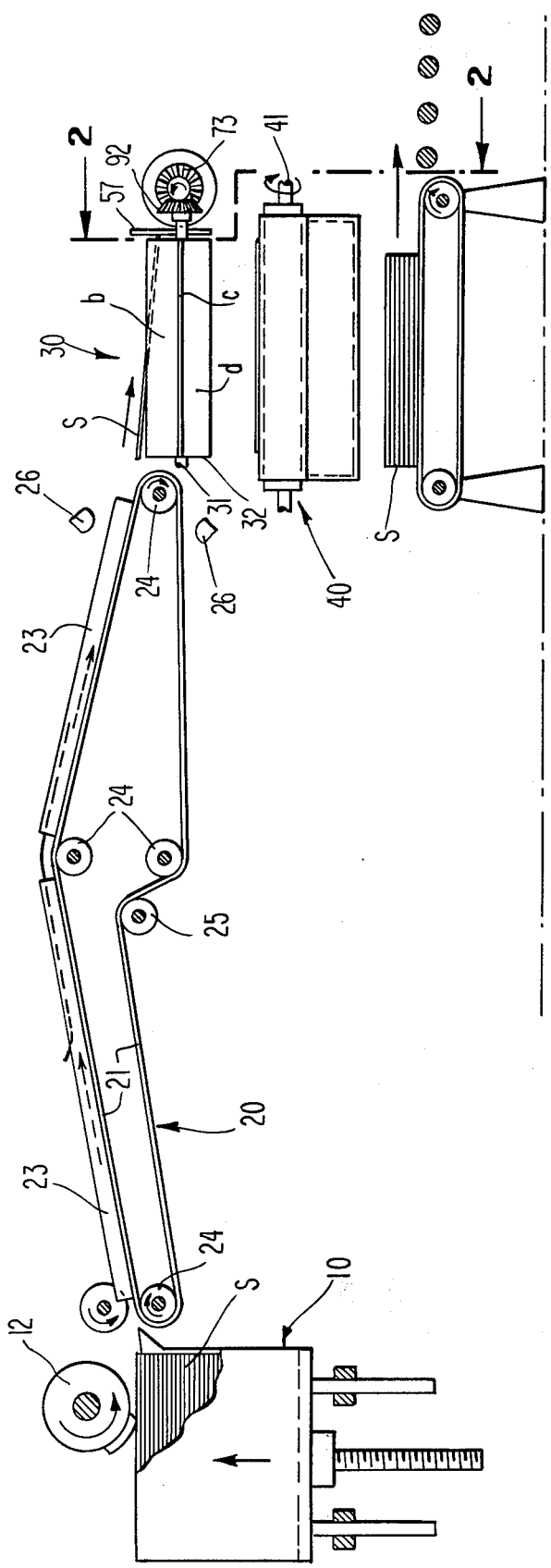
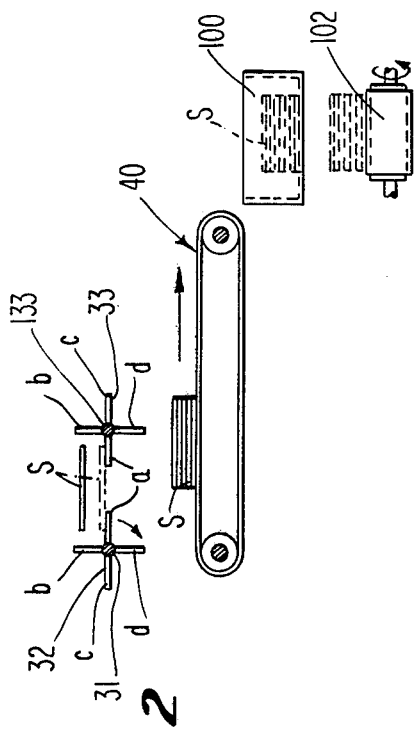
Fig. 1
Fig. 2

SHINGLE STACKING

BACKGROUND OF THE INVENTION

This invention relates to apparatus for automatically stacking shingles into squared bundles.

Individual shingles, ordinarily at least, are rectangular in shape and are non-uniform in thickness being thicker at one long edge than at the other. As a result, when a plurality of shingles are stacked into a squared bundle for packaging, if all of the thicker edges of the shingles are on the same side of the bundle, the bundle will be of unequal height at opposite edges and the bundles when packaged will be difficult to stack. It is known in the prior art that this undesirable situation may be avoided by turning over or flipping approximately half of the shingles of the bundle. The bundle will then have approximately the same height at its opposite edges.

The prior art has employed starwheels for shingle stacking. See Califano et al U.S. Pat. No. 3,205,794. However, there is no disclosure nor suggestion in Califano et al that a shingle may be flipped by the starwheel mechanism.

The prior art has also employed means for flipping a shingle. See Johnson et al U.S. Pat. No. 3,128,889. However, there is no disclosure nor suggestion in Johnson et al that the shingle be flipped by means of a starwheel. In Johnson et al, downwardly hanging shingle-flipping fingers are mounted above the path of movement of a shingle end, as the shingle travels along a transport belt, the fingers engage the leading edge of the shingle and flip the shingle.

SUMMARY OF THE INVENTION

A principal object of the present invention is to provide improved simplified apparatus for automatically flipping selected numbers of shingles during automatic stacking of shingles into squared bundles for packaging.

Another object is to provide an improved method of flipping selected shingles so as to produce a bundle of shingles having substantially equal height at all edges of the bundle.

The foregoing objects are achieved by employing a pair of starwheels in a different and novel manner to accomplish the desired flipping of selected shingles.

While it will be convenient to describe the present invention as applicable to shingle flipping, it will be apparent that the technique disclosed could be used for turning over or flipping other products.

BRIEF DESCRIPTION OF THE DRAWINGS

FIG. 1 is a simplified schematic elevational view of shingle packing apparatus incorporating the present invention.

FIG. 2 is an end elevational view looking along the line 2—2 of FIG. 1.

DETAILED DESCRIPTION OF THE PREFERRED EMBODIMENTS

Figure 3:
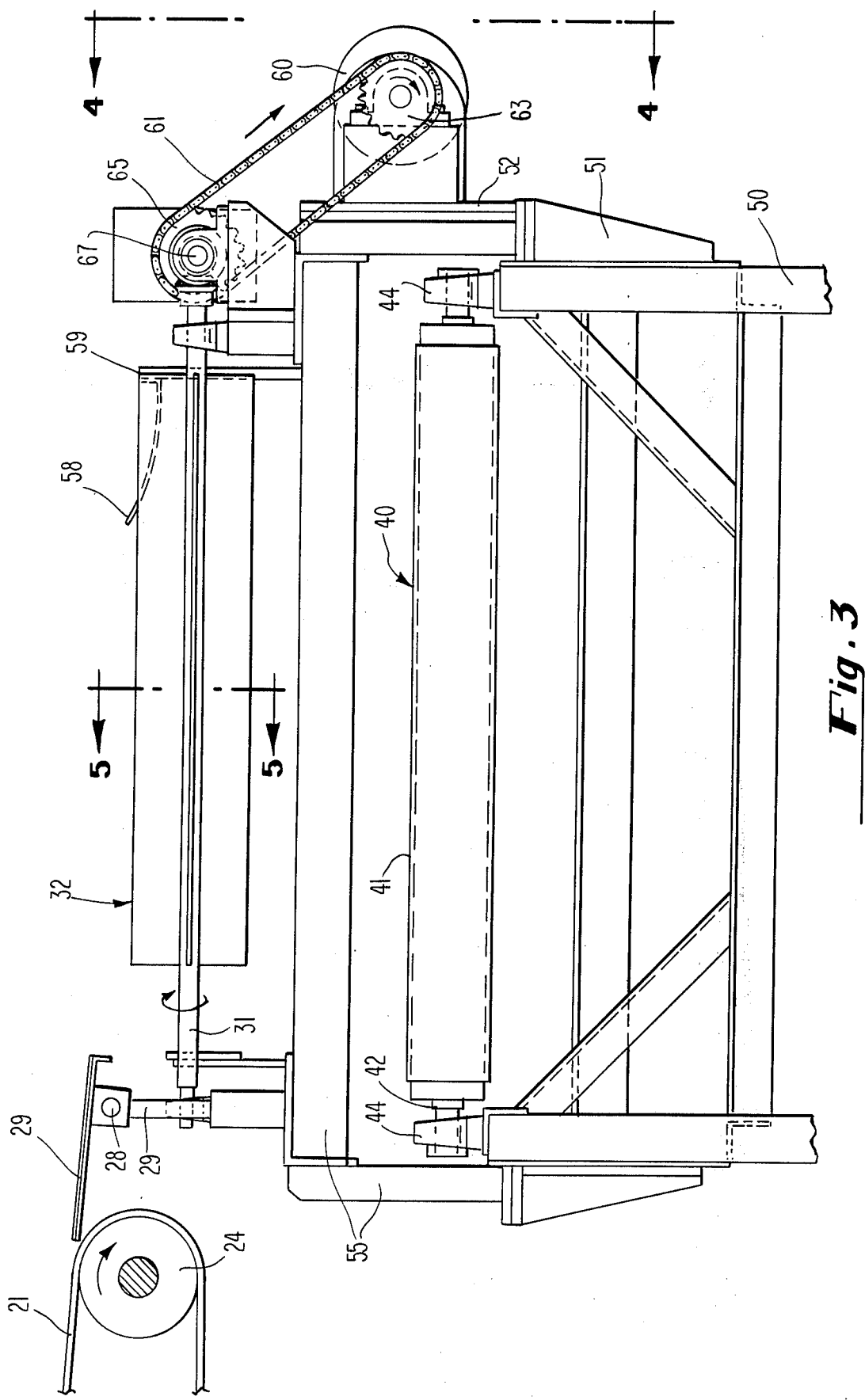
FIG. 3 is a somewhat more detailed elevational view of the right hand portion of the apparatus shown schematically in FIG. 1.

Since the present invention is concerned with how the shingles are flipped and packed, and not with how the shingles are fed to the shingle-flipping and packer mechanisms, the illustration in FIGS. 1-2 shows a simplified form of shingle feed such as was used for testing the shingle flipper. It may be noted, however, that in production, the shingle feed would include a cutter for cutting 3-foot, or 4-foot, or 6-foot wide continuous sheet into individual shingles.

Referring now to FIGS. 1-2, shingles S are shown stacked on a shingle feeder 10 and fed by an adjustable feed roll drive 12 to a delivery belt conveyor 20 which is illustrated as including an endless belt 21, an accelerator roll 22, side guides 23, a plurality of guide rolls 24, and a tension roll 25. As an illustration only of the high speed at which the belt 21 may travel in actual production, it should be noted that belt 21 should have a velocity of 900 feet per minute in order to deliver a maximum of 240 3-foot shingles per minute to the stacker.

Figure 9:
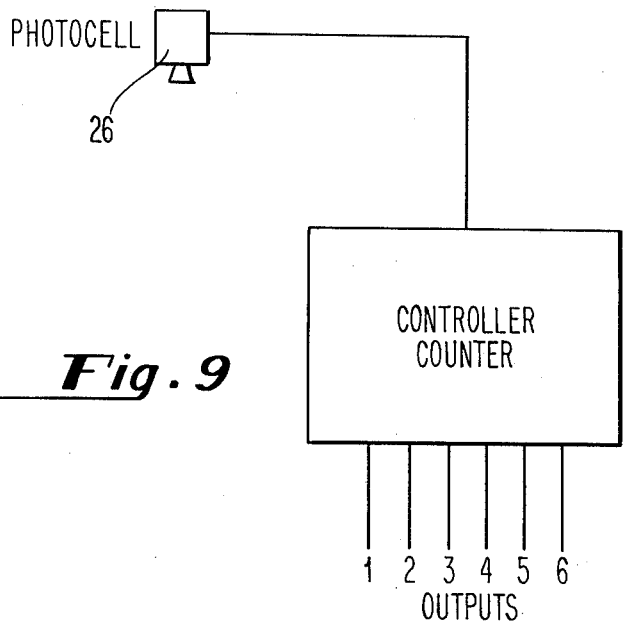
FIG. 9 is a block diagram of one suitable form of control circuitry.

The shingles S are delivered, one at a time, at a rapid rate such as indicated above, from the delivery end of conveyor belt 21 to a shingle catcher 30. The flipper control system includes an electric eye system 26 which counts the shingles as they are delivered from the conveyor belt to the shingle catcher and delivers one pulse per shingle to an electronic controller counter, as illustrated in FIG. 9.

Shingle catcher 30 comprises a transverse stop member 57 and a pair of starwheels 32 and 33 (see FIG. 2) which are mounted for controlled intermittent rotation in opposing directions about horizontally disposed parallel axes. In preferred form, each starwheel 32 and 33 has four movable shelves (identified $a$, $b$, $c$, and $d$) disposed radially at 90° spacing. At the time a shingle S is delivered to the starwheels, one shelf of each starwheel is in its horizontal shingle-receiving position. Such shelf is identified $a$ in the drawing (FIG. 2).

It will be seen that in relation to the transverse left-to-right movement of conveyor 40 as viewed in FIG. 2, the left starwheel 32 is the rear starwheel, and the right starwheel 33 is the front starwheel.

Figure 6:
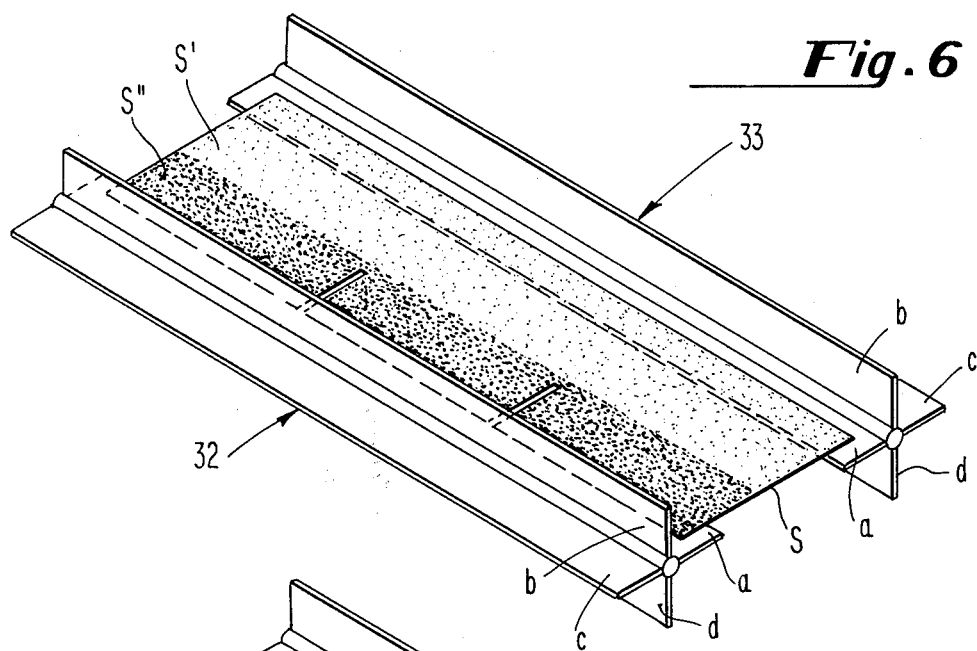
FIGS. 6, 7 and 8 are a series of perspective views illustrating how the shingle is flipped by the starwheels.
Figure 7:
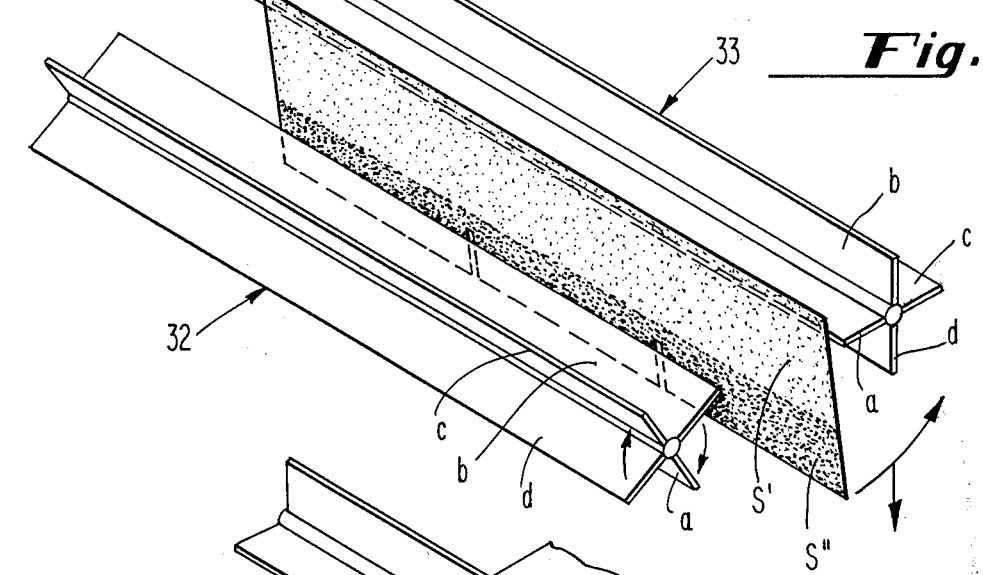
Figure 8:
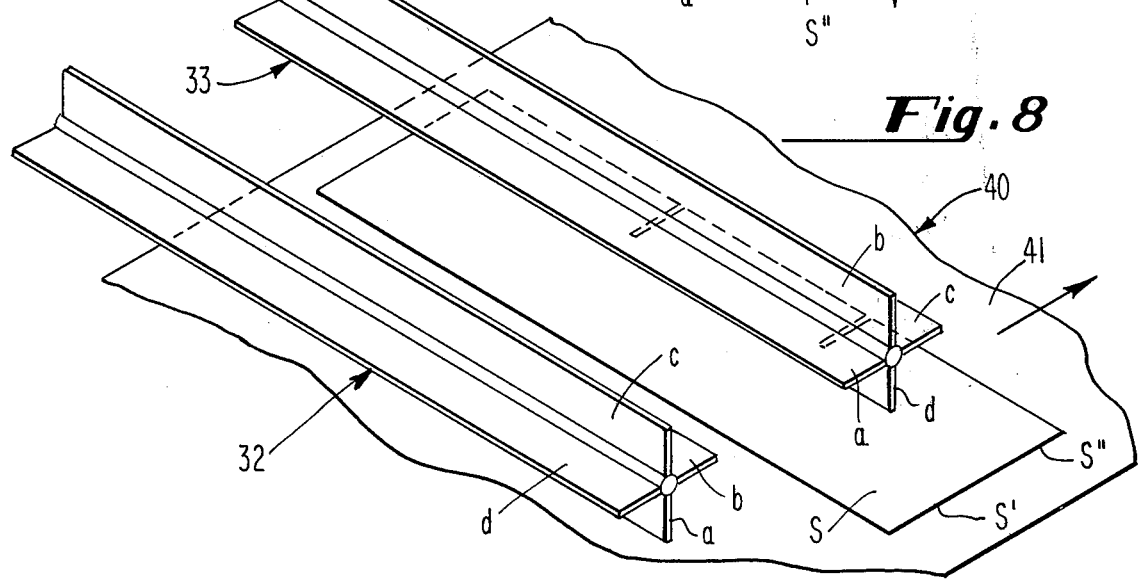

Referring now to FIGS. 6–8, it is there illustrated that one of the long edge portions S'' of the shingle is thicker than the other edge portion S'. In FIGS. 6–8, the thicker edge portion S'' is supported on shelf $a$ of the left or rear starwheel 32 (FIG. 2) and the thinner edge portion is supported on shelf $a$ of the right or front starwheel 33.

If it is desired that this shingle be flipped, the starwheel 32 is rotated rapidly clockwise through 90° while the right or front starwheel 33 is maintained motionless, as is illustrated in FIG. 7. This removes the shelf support under the back or thicker edge portion of the shingle, it being understood that "back edge portion" is defined in relation to the left-to-right movement of the conveyor 40. The thicker edge portion S'' starts to fall while the thinner front edge portion S' remains momentarily supported on the motionless shelf $a$ of the right or front starwheel 33. As the shingle starts to fall, it pivots in a counterclockwise direction about its long center axis, and passes from its original horizontal position toward the vertical, as seen in FIG. 7. The falling and turning momentum of the shingle carries its lower edge past the vertical, and when the shingle has reached the conveyor 40, it has completed, or almost completed, a 180° turn over, as illustrated in FIG. 8.

To accomplish flipping it is preferable that the thicker edge of the shingle be deposited on the rear starwheel 32, as the heavier weight of the leading falling edge increases the flip-over action. However, flipping may also be accomplished if the thinner edge happens to be on the rear starwheel 32. The important thing is to drop first that edge of the shingle which would be the back edge if the shingle were dropped onto conveyor 40 without flipping. This becomes the leading edge of the flipped shingle on conveyor 40.

Where the vertical spacing between starwheels 32 and 33 and the take-away conveyor 40 is insufficient to allow the falling shingle to complete its full turn-over, the movement of the conveyor acts to assist in the completion of turn-over or flipping.

The shingles which are being delivered one at a time to the shingle supporting shelves a of starwheels 32 and 33 may be dropped one at a time, with or without flipping, but as a practical matter it is preferable that the shingles be allowed to accumulate on shelves a until a group is formed. A typical group is five shingles. The group of shingles may then be dropped with or without flipping. If the group is not to be flipped, the starwheels 32 and 33 may be rotated in opposing directions through 90°. As viewed in FIG. 2, the left starwheel would be rotated clockwise and the right-hand starwheel 33 counter-clockwise. It will be evident that this drops the group of shingles onto conveyor 40 without turnover or flipping of the group. As will be described later, the group of shingles may also be dropped without flipping by rotating only the front starwheel while maintaining the rear starwheel motionless.

The shingles which have been dropped by the starwheels 32,33 onto the conveyor 40 are carried by the conveyor to a stacker and squarer 100. After an equal or approximately equal number of flipped and unflipped shingles S have been delivered to the stacker-squarer 100 to form a bundle of desired height, the bundle is delivered to and carried away on conveyor 102, as illustrated schematically in FIG. 2.

Figure 4:
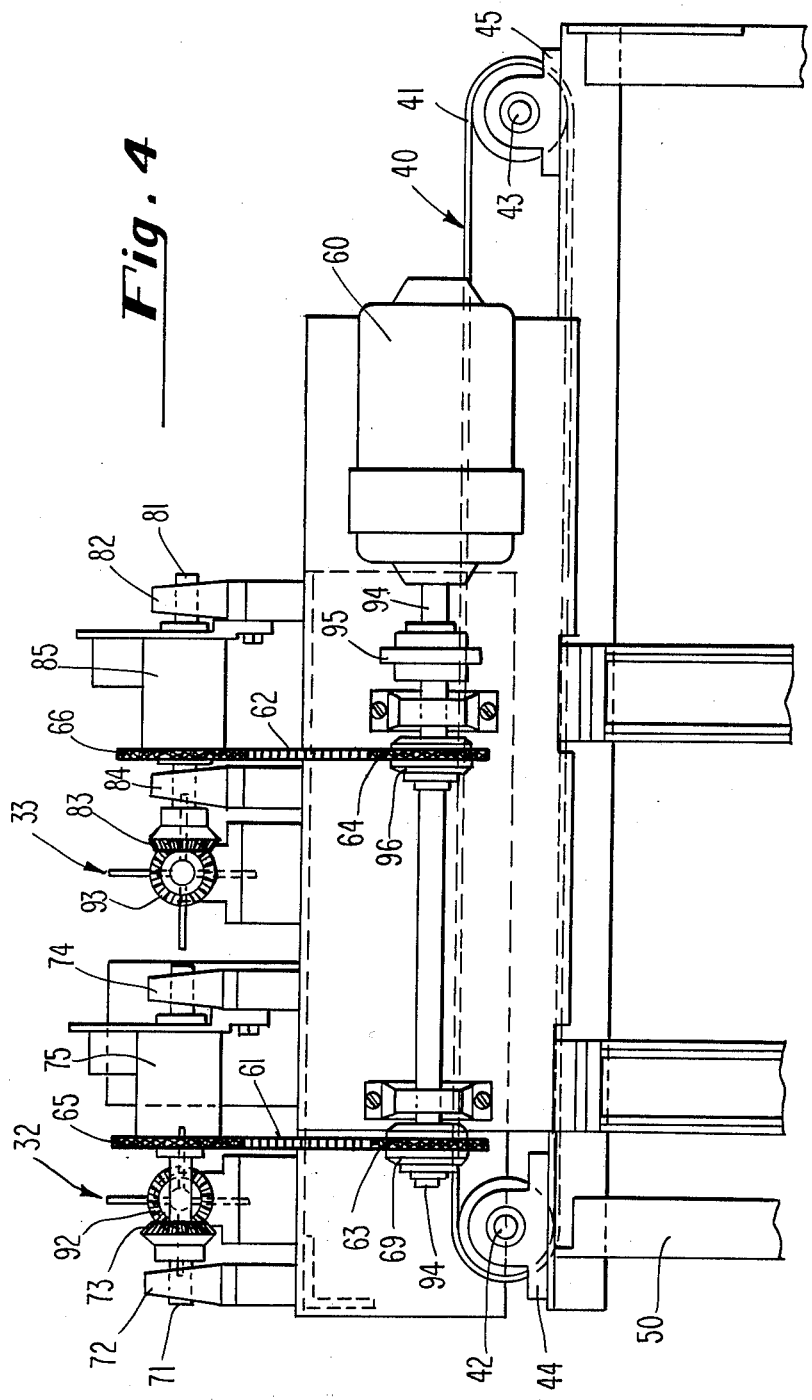
FIG. 4 is an end elevational view looking along the line 4—4 of FIG. 3.

Reference is now made to FIGS. 3 and 4 which show in greater detail the starwheel drive mechanism.

As seen in FIGS. 3 and 4, conveyor 40, supported on a conveyor frame 50, includes an endless belt 41 supported on roller shafts 42, 43 journalled in pairs of ball-bearing pillow blocks 44,45. Endless belt 41 is driven by known means, not illustrated.

Supported on conveyor frame 50, as by supports 51, is a frame 55 which supports the starwheels 32,33 and their drive mechanisms. Supported on a bracket 52 on the starwheel frame 55 is a gear reduction motor 60 having an output shaft 94 which drives a shaft 194 through a flexible coupling 95. Supported on drive shaft 194 are a pair of spaced-apart sprockets 63 and 64 which are driven by the drive shaft 194 through a pair of torque-limitor mechanisms 69 and 96. Sprockets 63 and 64 drive endless chains 61 and 62, respectively, and chains 61,62 in turn drive a pair of sprockets 65 and 66. Sprocket 65 drives a drive shaft 71 through a clutch brake 75. Sprocket 66 drives a drive shaft 81 through a clutch brake 85. Drive shaft 71 is supported at its ends in a pair of ball-bearing pillow blocks 72,74. Drive shaft 81 is supported at its ends in a pair of ball-bearing pillow blocks 82,84.

Mounted on drive shaft 71 is a bevel gear 73 which is in mesh with and drives a bevel gear 92 which is mounted on shaft 31 on which the left or rear starwheel 32 is mounted. Mounted on drive shaft 81 is a bevel gear 83 which is in mesh with and drives a bevel gear 93 which is mounted on a shaft 133 on which starwheel 33 is mounted.

The clutch brake mechanisms 75 and 85 are of known type. They may, for example, be Model CB-8-S-CW-24 V.D.C. purchased from PSI, Division of Warner Electric Company, Pitman, N.J. In accordance with a preferred incremental rotation of 90° per step, the unit is modified to provide four stops at 90° intervals. Each of the clutch-brake units 75 and 85 is independently controlled by well known means, not illustrated.

Figure 5:
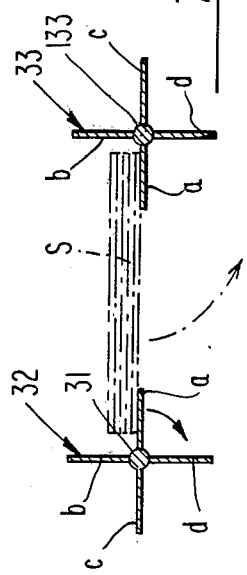
FIG. 5 is a view, in section, looking along the line 5—5 of FIG. 3.

FIG. 5 is a view, in section, looking along the line 5—5 of FIG. 3 and illustrates that which has already been described, namely, that when a group of shingles S, which has been supported on the support shelves a of starwheels 32 and 33, is to be flipped, such flipping is accomplished by rotating the left or rear starwheel 32 incrementally through 90°, in the clockwise direction as indicated by the arrow, while the right or front starwheel 33 is maintained motionless. This causes the rear edge portion of the shingle group to fall, in the direction indicated by the dot-and-dash arrow, while the front edge portion remains momentarily supported on shelf a of starwheel 33. The shingles will flip provided the vertical spacing between the starwheel shelves a and conveyor belt 41 is sufficient to allow the falling shingles to attain an angle of at least 75° from the horizontal before the leading edge strikes the moving belt 41.

A group of shingles may be dropped without flipping if the spacing between the starwheel shelves a and the belt 41 is right, by rotating only the front starwheel 33 (counter-clockwise) while maintaining the rear starwheel 32 motionless. This causes the front edge portion of the shingle group to fall while the rear edge portion remains momentarily supported on shelf a of the rear starwheel 32. If the vertical spacing between the shelves a and the conveyor belt 41 is insufficient to allow the falling shingles to attain a vertical position the shingles will drop on to the belt unflipped.

Thus, if the vertical spacing between the starwheel shelves a and the conveyor belt 41 is of approximately the same dimension as the width of the shingle from the rear or left edge to the front or right edge, the shingle group may be flipped by rotating only the rear or left starwheel, and may be dropped unflipped by rotating only the front or right starwheel.

Figure 10:
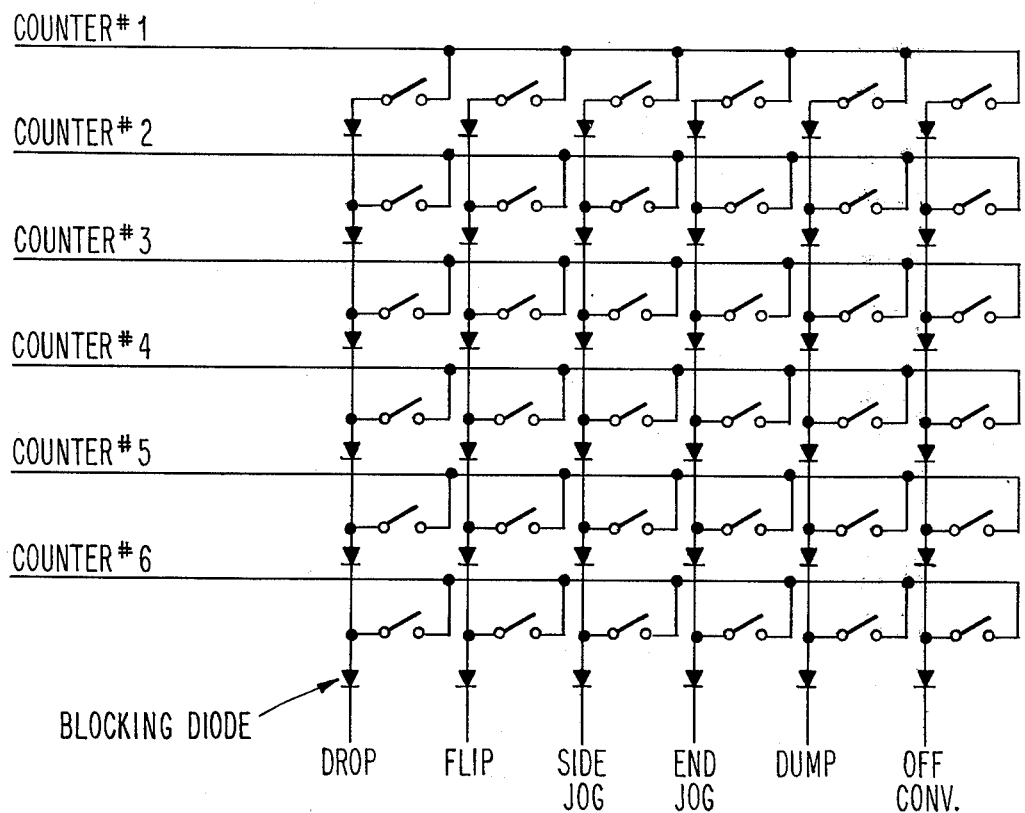
FIG. 10 is a schematic diagram of the matrix board that is inside the controller-counter of FIG. 9.

One suitable form of control circuitry is illustrated in block diagram form in FIG. 9, and in FIG. 10 is shown a schematic diagram of the matrix board that is used inside the counter-controller of FIG. 9. Photocell system 26 delivers one pulse for each shingle which is delivered to the starwheels. These pulses are applied to the controller-counter which may be either a Murray-Frayher or a Westinghouse Numalogic unit custom built for the purpose. This unit consists of solid state logic that is triggered by the pulses from the photocell 26 as the shingles pass by. In the controller-counter there are six counters each of which is adapted to be thumbwheel set by the operator to count the shingles into groups to give the groups required to make-up the desired or standard shingle bundle. As each successive counter counts out, it sends a signal along its unique output line into a 6 × 6 switching matrix, shown in FIG. 10. This signal can then be switched, by closing the proper switch(es) in the matrix, to any one of six output functions, identified in FIG. 10 as drop, flip, side jog, end jog, dump and off conveyor. Any combination of one to six inputs can be used to initiate any combination of one to six outputs. The blocking diodes are necessary to prevent unwanted feedback which would cause unwanted output signals.

As an illustration, assume that twenty shingles are to be stacked in a bundle and that the first ten are to be flipped and the next ten are to be dropped (unflipped). Counters #1, #2, #3 and #4 would be set at 5; counters #5 and #6 would be set at zero. The appropriate output switches in the Matrix board (FIG. 10) would be closed and the first five shingles would be counted and flipped as a group, the next five shingles would be counted and flipped as a group, the next five shingles would be counted and dropped as a group, and the last five shingles would be counted and dropped as a group. Then the bundle of twenty is dumped onto the off conveyor. This sequence will repeat continuously.

What is claimed is:

1. Apparatus for stacking shingles and like objects of generally rectangular shape and unequal thickness, said apparatus comprising:
  a. a conveyor means;
  b. a pair of starwheels each having a plurality of radially-disposed movable shelves, one shelf of each starwheel being in shingle-supporting position, the other shelves then being in non-supporting positions, said starwheels being disposed in front and rear positions relative to said conveyor means;
  c. means for rotating said starwheels selectively and independently to move a shelf from a shingle-supporting position to a non-supporting position and to move another shelf of the same starwheel from a non-supporting position into a shingle-supporting position;
  d. means for delivering shingles successively to a pair of shelves in shingle-supporting position to support one edge portion of a shingle on a shelf of one starwheel and the other edge portion of said shingle on a shelf of the other starwheel;
  e. said means for rotating said starwheels selectively and independently including means for selectively rotating at least the front starwheel through a selected number of degrees to cause one or more self-supported shingles to drop onto said conveyor means without being flipped, or selectively rotating only the rear starwheel through a selected number of degrees to flip one or more shelf-supported shingles onto said conveyor means.

2. Apparatus according to claim 1 wherein said means for selectively and independently rotating said starwheels includes means for rotating both said starwheels simultaneously in opposing directions.

3. Apparatus according to claim 1 wherein said means for selectively rotating at least the front starwheel comprises means for rotating only the front starwheel while maintaining the rear starwheel motionless.

4. Apparatus according to claim 3 wherein the vertical distance between said shelves in shingle-supporting position and said conveyor means is insufficient to allow said falling shingle to pivot through 180° before it arrives at said conveyor means, the movement of said conveyor means assisting the shingle to complete its drop or its flip, as the case may be.

5. Apparatus according to claim 4 wherein said distance between said shelves in shingle-supporting position and said conveyor means is insufficient to allow said falling shingle to pivot beyond approximately 75° from the horizontal.

6. Apparatus according to claim 5 wherein said distance between said shelves in shingle-supporting position and said conveyor means is approximately equal to the width of a shingle.

7. Apparatus according to claim 2 wherein:
  a. each starwheel has four shelves at 90° spacing;
  b. said means for rotating said starwheels selectively and independently through a selected number of degrees includes means for rotating said rear starwheel through 90° while maintaining said front starwheel motionless.

8. Apparatus according to claim 3 wherein:
  a. each starwheel has four shelves at 90° spacing;
  b. said means for rotating said starwheels selectively and independently through a selected number of degrees includes means for rotating said rear starwheel through 90° while maintaining said front starwheel motionless.

9. Apparatus according to claim 7 wherein said means for rotating said starwheels selectively and independently through a selected number of degrees includes a clutch-brake mechanism.

10. Apparatus according to claim 8 wherein said means for rotating said starwheels selectively and independently through a selected number of degrees includes a clutch-brake mechanism.

* * * * *